UNITED STATES PATENT OFFICE.

MAURICE A. SMITH, OF JEANNETTE, PENNSYLVANIA, ASSIGNOR TO McKEE GLASS COMPANY, OF JEANNETTE, PENNSYLVANIA, A CORPORATION OF PENNSYLVANIA.

GLASS.

1,365,797.  Specification of Letters Patent.  Patented Jan. 18, 1921.

No Drawing.  Application filed July 15, 1918. Serial No. 244,886.

*To all whom it may concern:*

Be it known that I, MAURICE A. SMITH, a citizen of the United States, and resident of Jeannette, in the county of Westmoreland and State of Pennsylvania, have invented a new and useful Improvement in Glass; and I do hereby declare the following to be a full, clear, and exact description thereof.

My invention relates to the manufacture of glass, and more particularly to glass having a low co-efficient of expansion which will withstand an extreme variation of temperature both as to heat and cold. Different formulas for glasses of low co-efficient of expansion have been employed, but many of these while standing up under extreme heat conditions will not stand up under extreme conditions of temperature below freezing.

In my improved glass I employ broadly speaking sand, boric oxid, alumina, sodium nitrate and arsenic. The proportions of these ingredients in a batch giving good results are as follows:

| | |
|---|---|
| Sand ($SiO_2$) | 60% |
| Boric oxid ($B_2O_3$) | 10% |
| Alumina ($Al_2O_3$) | 7% |
| Sodium nitrate ($NaNO_3$) | 9% |
| White arsenic ($As_2O_3$) | 1% |
| Calcium carbonate ($CaCO_3$) | 3% |
| Sodium carbonate ($Na_2CO_3$) | 10% |

These percentages, however, may differ somewhat, and I do not wish to confine myself to the exact proportions stated. Not only is the glass made from the above formula suitable for extreme degrees of low temperature, but it will also withstand extreme conditions of temperature below freezing.

What I claim is:—

1. A glass having low coefficient of expansion and high resistance to high and low temperatures, said glass being made from a batch consisting of a preponderance of silica, smaller amounts of boric oxid, alumina, sodium nitrate and sodium carbonate, and still smaller amounts of calcium carbonate and arsenic trioxid.

2. A glass made from a batch composed of the following ingredients in approximately the proportions stated: 60% of silica, 10% of boric oxid, 7% of alumina, 9% sodium nitrate, 1% of arsenic trioxid, 3% of calcium carbonate and 10% of sodium carbonate.

In testimony whereof, I, the said MAURICE A. SMITH, have hereunto set my hand.

MAURICE A. SMITH.

Witnesses:
ROBT. D. TOTTEN,
JOHN F. WILL.